Sept. 25, 1951 R. E. PARKER 2,569,257
HOT COFFEE DISPENSER
Filed June 17, 1948 3 Sheets-Sheet 1

INVENTOR.
Ralph E. Parker
BY
ATTORNEY.

Sept. 25, 1951　　　　R. E. PARKER　　　　2,569,257
HOT COFFEE DISPENSER
Filed June 17, 1948　　　　　　　　　　3 Sheets-Sheet 2
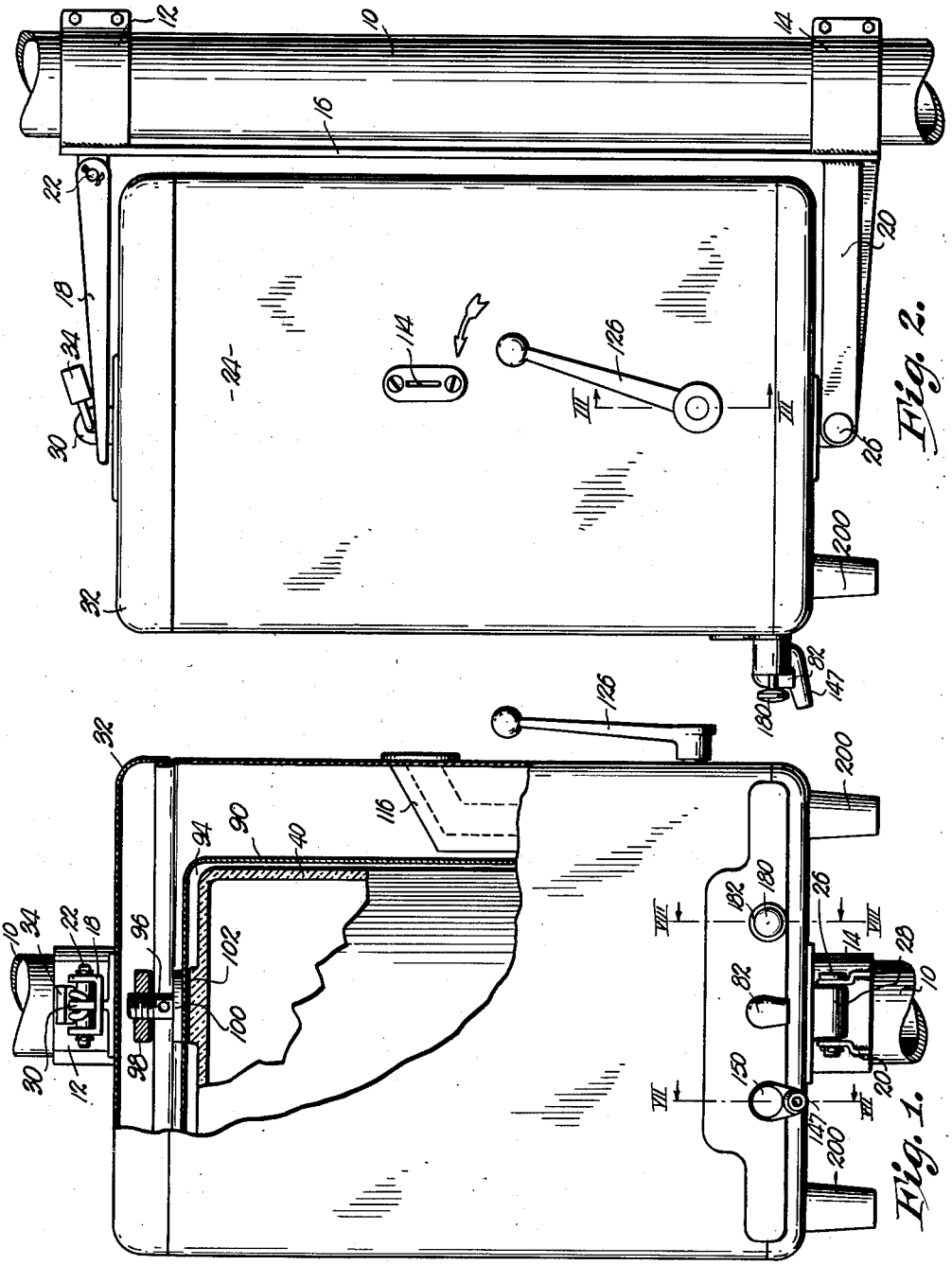
INVENTOR.
Ralph E. Parker
BY
ATTORNEY.

Sept. 25, 1951  R. E. PARKER  2,569,257
HOT COFFEE DISPENSER
Filed June 17, 1948  3 Sheets-Sheet 3
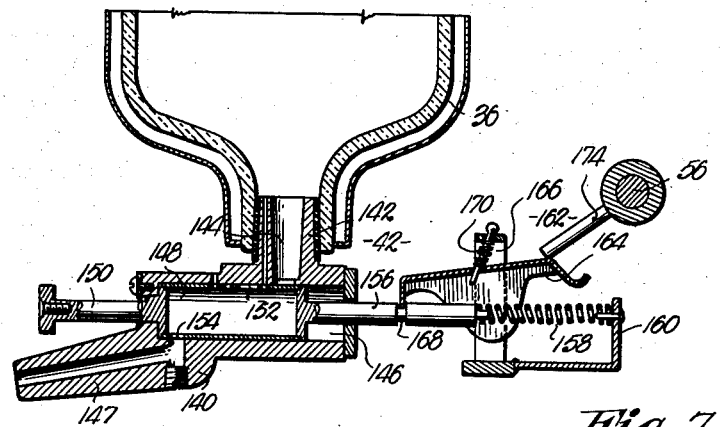
Fig. 7.
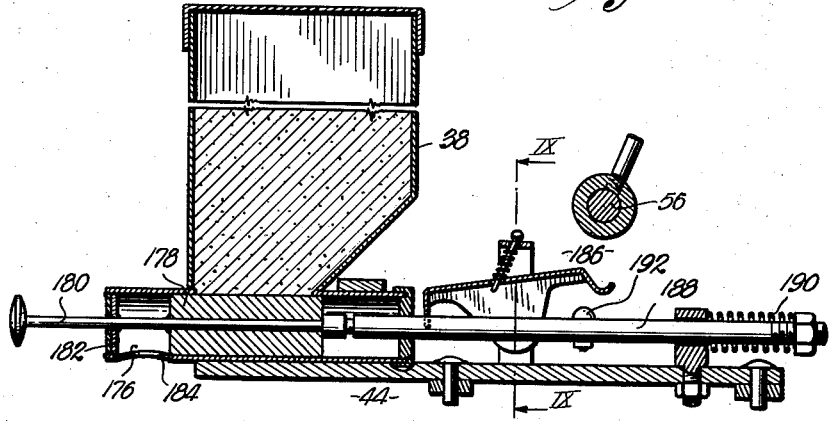
Fig. 8.
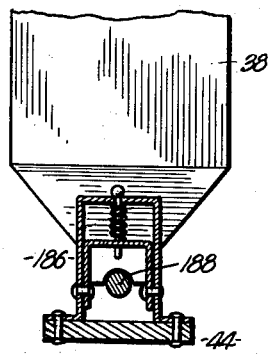
Fig. 9.
INVENTOR.
Ralph E. Parker
BY
ATTORNEY.

Patented Sept. 25, 1951

2,569,257

UNITED STATES PATENT OFFICE 2,569,257

HOT COFFEE DISPENSER

Ralph E. Parker, Wichita, Kans.

Application June 17, 1948, Serial No. 33,496

3 Claims. (Cl. 225—21)

This invention relates to coin controlled vending mechanisms and more particularly to a device for automatically dispensing a hot drink such as coffee, together with sugar and/or cream, as the purchaser desires, the primary object being to provide a relatively inexpensive structure that is easily manufactured and simple to operate, yet as efficient in operation as the more expensive and the highly complicated conventional types of such machines.

The most important object of this invention is the provision of a dispenser for coffee or the like having a container for the coffee itself and containers for sugar and cream respectively, each having a separate vending mechanism manually operable to dispense the particular ingredient in measured quantities, the sugar and cream mechanisms being normally inoperable and rendered capable of manual operation only through actuation of the coffee vending mechanism.

Another object of this invention is to provide in a dispenser of the aforementioned character a normally locked device for each of the sugar and cream vending mechanisms respectively shiftable to an unlocked position by parts forming a part of the manually actuated structure for vending the coffee.

A further object of this invention is to provide a dispenser having locking means as above set forth provided with elements for yieldably holding the same in either the locked or unlocked position.

A still further object of this invention is to provide locking means as just above mentioned having structure forming a part of the cream and sugar vending mechanisms respectively for automatically moving the locking means toward the locked position.

Another important object of this invention is to provide a specially formed coin control, wherein the coin that is inserted by the customer joins together the sections of a rotatable shaft, to the end that such sections will rotate together and having means for moving the coin from the sections after the coffee has been dispensed and as the rotatable shaft returns to the normal inoperative position.

Many other objects of this invention relate to details of construction, such as the precise way in which the vending mechanisms themselves are formed; the way in which conventional containers may be used if desired for the ingredients; the simple and easy manner of filling the dispenser with the ingredients; the way in which the entire structure may be kept clean with a minimum of effort and other advantageous features, all of which will be made clear as the following specification progresses, reference being had to the accompanying drawings, wherein:

Fig. 1 is a front elevational view of a hot coffee dispenser made in accordance with the present invention, parts being broken away to reveal details of construction.

Fig. 2 is a side elevational view thereof.

Fig. 7 is a fragmentary cross-sectional view taken on line VII—VII of Fig. 1, looking in the direction of the arrows.

Fig. 8 is a fragmentary, transverse, cross-sectional view taken on line VIII—VIII of Fig. 1; and Fig. 9 is a fragmentary, detailed, cross-sectional view taken on line IX—IX of Fig. 8.

Figure 3:
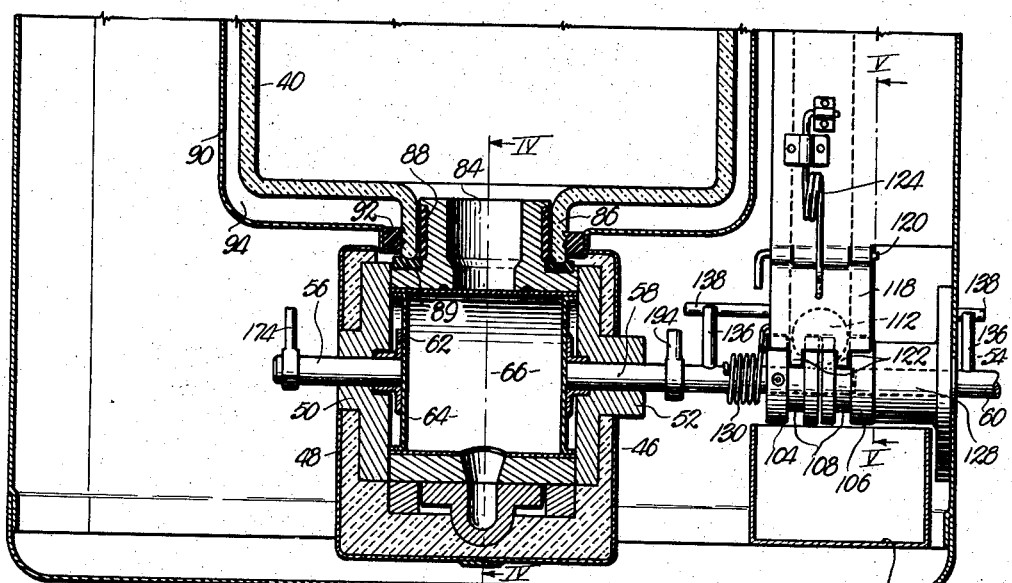
Fig. 3 is a fragmentary, enlarged, cross-sectional view taken on line III—III of Fig. 2.

In the drawing, and particularly as shown in Figs. 1 and 2, a vertical, preferably tubular, standard 10, suitably mounted in any manner not herein shown, serves as a support for the hot coffee dispenser about to be described. A pair of brackets 12 and 14 clamped to the standard 10 and joined together by a bar 16 have a pair of spaced-apart normally horizontal arms 18 and 20 extending laterally therefrom. The arm 20 is preferably rigid and immovable, while arm 18 is swingably mounted through the medium of a pivot pin 22.

A hollow, cylindrical, cabinet broadly designated by the numeral 24 is supported by the arms 18 and 20. Arm 20 is bifurcated as shown in Fig. 1 and has a pivot pin 26 passing through a down-turned projection 28 on the normally bottom wall of cabinet 24, said projection 28 being disposed between the furcations of arm 20.

The arm 18 is U-shaped in cross section, as shown in Fig. 1, and has a slot formed in the bight thereof near the outermost free end for receiving an upturned ear 30 mounted upon the uppermost face of a removable lid 32 for cabinet 24. This ear 32 has an opening formed therein for receiving a padlock 34 or other fastening means.

A plurality of receptacles for ingredients to be mixed in forming a drink are disposed within the cabinet 24. These receptacles include a cream container 36 (Fig. 7), a sugar container 38 (Fig. 8), and a hot coffee receptacle 40 (Figs. 1 and 3). Each of these receptacles 36, 38 and 40 is provided with manually operable vending structure broadly designated by the numerals 42, 44 and 46, respectively.

The vending structure 46 for the receptacle 40 includes a hollow chamber 48 having a pair of spaced-apart bearings 50 and 52 mounted on the side walls thereof for rotatably receiving an elongated normally horizontal shaft 54. This shaft 54 is sectional, there being three sections designated by the numerals 56, 58 and 60, respectively.

The section 56 of shaft 54 passes through the bearing 50 and is secured at its innermost end by means of a flange coupling 62 to one end wall 64 of a cylindrical body 66. The opposite end of the body 66 receives the section 58 of shaft 54 in the same manner, this section 58 passing through the bearing 52.

Body 66 is rotatably mounted within a solid block 68 disposed within the chamber 48 and encased within suitable insulation 70. A port 72 is formed in the side wall of cylindrical body 66 and this port 72 is normally in register with a drain spout broadly designated by the numeral 74. This drain spout 74 has one section 76 thereof formed in the bottom of the block 68, another section 78 formed in a member 80 also mounted within the insulation 70 of chamber 48, and a third section registering with section 78 and constituting an elongated tubular member 82 extending outwardly from the chamber 48 and, also, to the exterior of cabinet 24 as illustrated in Figs. 1 and 2.

Figure 4:
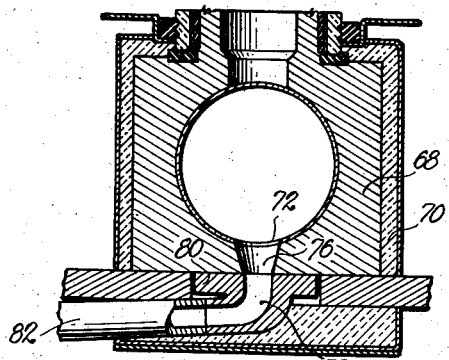
Fig. 4 is a fragmentary, cross-sectional view taken on line IV—IV of Fig. 3.

As shown in Figs. 3 and 4, the block 68 extends upwardly through the chamber 48 and has an inlet opening 84 formed therein communicating with the receptacle 40 and disposed to register with the port 72 of body 66 when the latter is rotated in the manner hereinafter more fully described.

It is contemplated that the receptacle 40 for containing prepared coffee constitute a conventional type of thermos container or a receptacle of like construction having a neck 86 that circumscribes that portion of block 68 extending upwardly above chamber 48 in the manner shown in Figs. 3 and 4. A liquid seal is provided by means of a gasket or the like 88 that circumscribes that portion of the block 68 for receiving neck 86 of receptacle 40, together with a gasket 89 that supports the lowermost edge of neck 86 of receptacle 40.

The block 68, also, supports a shell 90 that houses the receptacle 40. A gasket 92 is interposed between the neck of shell 90 and neck 86 of receptacle 40 to present an additional seal. It is thus seen that inasmuch as the walls of shell 90 are spaced from the outermost face of receptacle 40, a dead air space 94 is presented for additional insulation to maintain the coffee within the receptacle 40 in a heated condition.

In addition to the shell 90 and receptacle 40 resting upon the block 68 of the assembly 46, these two members are held in position by means of a screw 96. A cross bar 98 mounted in the lid 32 of cabinet 24 threadably receives the screw 96, and the latter is provided with an out-turned flange 100 at its lowermost end that bears against the uppermost end of shell 90. A resilient plate 102 interposed between the uppermost ends of receptacle 40 and shell 90 serves to hold the receptacle 40 in place when the screw 96 is moved to the operative position shown in Fig. 1.

The proximal ends of the sections 58 and 60 of shaft 54 are provided with collars 104 and 106 respectively, each provided with a continuous annular groove 108. The collars 104 and 106 are provided with normally registering radial slots 110 disposed upwardly for receiving a coin or the like 112 that is inserted by the customer through an opening 114 formed in the container 24. A coin chute 116 directs the coin 112 from the opening 114 to the slots 110 of collars 104 and 106.

Figure 5:
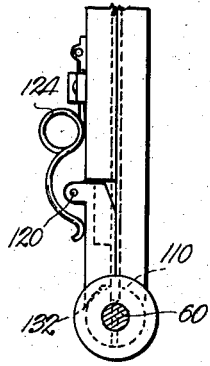
Fig. 5 is a detailed cross-sectional view taken on line V—V of Fig. 3, looking in the direction of the arrows.
Figure 6:
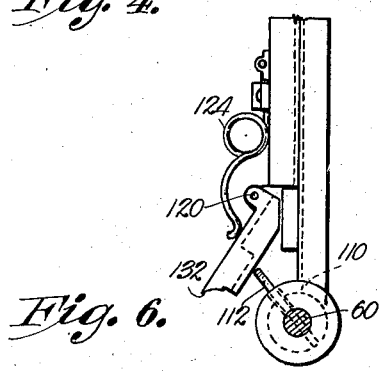
Fig. 6 is a cross-sectional view similar to that illustrated in Fig. 5, but showing the coin removing device in a different position.

A plate 118, hingedly mounted as at 120 at a point above the shaft 54 and collars 104 and 106, depends downwardly and rests upon the collars 104 and 106. The lowermost edge of this plate 118 is provided with a pair of ears 122 that normally fit within the annular grooves 108 of collars 104 and 106. As illustrated in Figs. 3, 5 and 6, when the coin 112 is initially inserted in the slots 110, the flap or plate 118 is disposed on one side of coin 112, this flap 118 actually forming a part of the coin chute 116 at its lowermost end.

The flap 118 is yieldably held in the position illustrated in Figs. 3 and 5 by a spring 124 that is mounted directly upon the coin chute 116 and depends downwardly to rest directly against the outermost face of flap 118 below hinge pin 120, as shown in Figs. 3, 5 and 6.

Manipulation of the shaft 54 is through the medium of a crank 126 mounted exteriorly of the cabinet 24 and directly upon the outermost end of section 60 of shaft 54. This section 60 is journalled for rotation in a bearing 128 mounted within the cabinet 24.

Sections 56 and 58 of shaft 54 are normally held in the inoperative position shown in Fig. 3 by means of a spring 130 coiled about section 58 and having one end thereof fixed to said section 58. The opposite end of spring 130 is secured to any immovable part of the dispenser, such as the coin chute 116. As illustrated in Figs. 5 and 6, the depending ears 122 of the flap 118 are curved to conform to the contour of the grooves 108 of collars 104 and 106, presenting relatively sharp outermost free ends 132.

It is clear from the foregoing that before any coin 112 is inserted in slot 114, manipulation of crank 126 will only cause rotation of section 60 of shaft 54 and the collar 106. The sections 56 and 58, together with the parts of the assembly joined thereto, will remain in the normal inoperative position by virtue of the spring 130. When, however, a coin is inserted by a purchaser, the collars 104 and 106 will be joined by such coin 112 and subsequent movement of the arm 126 in the direction of the arrows shown in Fig. 2 will cause simultaneous rotation of all sections 56, 58 and 60 of shaft 54.

As the two collars 104 and 106 rotate together with the coin 112, the flap 118 will be swung outwardly on hinge pin 120 against the action of spring 124 in the manner illustrated in Fig. 6. As shaft 54 is continued to be rotated, the uppermost edge of coin 112, which projects above the collars 104 and 106, will move to a position clearing the lowermost edge of plate 118, and, therefore, the sharp edges 132 of the two ears 122.

When the shaft 54 is returned to the original inoperative position either by virtue of the spring 130 or by operator manipulation, one face of coin 112 will strike the sharp edges 132 of flap 118. The coin 112 will then be automatically pulled from the slots 110 for disposition in a coin box 134. After this coin 112 drops into the coin box 134, the shaft 54 is free to return to the normal inoperative position and the section 60 thereof is again free to rotate separately from sections 56 and 58. Radial pins 136 on the sections 58 and 60 of shaft 54 strike stops 138 for limiting the rotation of shaft 54 in the opposite direction.

It is further clear that when the shaft 54 is thus rotated, because of the action of coin 112, the port 72 of cylindrical body 66 will move to a point where the same is in register with inlet opening 80 that communicates with receptacle 40.

Any suitable means (not shown) may be used to limit the extent of rotation of the shaft 54 to 180°, to the end that port 72 will register with opening 84. When so registered, the liquid coffee will flow into the body 66 until the same is full, thereby providing a measured quantity of such coffee which will be dispensed through the spout 74 when body 66 returns to the normal position illustrated in Fig. 3.

It is to be understood that the description thus far includes the vending only of black liquid coffee. If the purchaser desires sugar and/or cream, he actuates vending structures 42 and 44 shown in Figs. 7 and 8 respectively, after coin 112 has been inserted, and after the crank 126 has been actuated.

The cream vending mechanism 42 includes a body 140 having an upturned projection 142 for receiving the neck of cream container 36 that is, in turn, provided with an inlet opening 144. A longitudinal bore 146, preferably of polygonal cross-sectional contour, is formed in body 140 and registers with the opening 144 as well as with a spout 147 that extends to the exterior of cabinet 24 as shown in Fig. 1.

A hollow container 148 is reciprocably mounted within the bore 146 and has a plunger pin 150 extending outwardly from one end thereof beyond the body 140. This container 148 has an inlet opening 152 in the top thereof and an offset outlet opening 154 formed in its bottom wall.

It is thus seen that, when the container 148 is at the outermost end of its path of travel and in the normal position shown in Fig. 7, the opening 154 is in register with drain spout 146. Conversely, when the container 148 is at the innermost end of its path of travel, opening 154 moves out of register with the spout 146 and the inlet opening 152 is moved to a point where the same communicates with the opening 144 that extends into the container 36.

That end of the container 148 opposite to the plunger rod 150 has an elongated pin 156 extending outwardly from body 140. A coil spring 158 is interposed between the outermost free end of pin 156 and a bracket 160 to yieldably hold the container 148 in the normal position shown in Fig. 7.

When the assembly 42 is in this said position, a locking structure broadly designated by the numeral 162 releasably holds the container 148 against reciprocable movement. This locking structure 162 includes a dog 164 swingably mounted on a horizontal axis within a U-shaped bracket 166. One end of this dog 164 has a notch formed therein conforming to the contour of pin 156 and fittable into an annular groove 168 formed in the pin 156.

An off-center pin and spring assembly 170, joining bracket 166 and dog 164, yieldably holds the dog 164 in a locking position within the groove 168. As shown in Fig. 3, a radial pin 174 mounted upon section 56 of shaft 54 is disposed to engage the dog 164 when the shaft 54 is rotated. This engagement causes rotation of dog 164 in bracket 166, releasing the dog 164 and moving the latter to a point where spring assembly 170 yieldably holds dog 164 in the unlocked position.

It is thus seen that a customer cannot cause vending of cream until the coin 112 has been inserted and the shaft 54 rotated, since such rotation causes release of the locking assembly 162. The operator may then cause vending of a quantity of cream in accordance with the size of container 148 by manipulation of plunger 150 against the action of spring 158.

As the plunger 150 moves inwardly, the outermost free end of the pin 156 comes into contact with a downturned portion on dog 164 opposite to the notch for engaging groove 168 to return the dog 164 to a position where it will again lock with groove 168 after plunger 150 reaches the outermost end of its path of travel.

The sugar container 38 is registrable at its lowermost end with a hollow body 176 that has a reciprocable block 178 mounted therein. A plunger 180 joint with this block 178 and has a plate 182 secured thereto in spaced relationship to one end of block 178. Body 176 has an outlet opening 184 that normally registers with the space between plate 182 and the proximal end of block 178. As plunger 180 is moved inwardly, sugar is free to flow from container 38 into the body 176 and particularly in said space between plate 182 and block 178.

Locking means 186 for the sugar dispensing assembly 44 is essentially the same as that just above described with respect to locking means 162. As shown in Fig. 9, the dog 164, as well as the dog for the assembly 44, is U-shaped in cross section and has the pin 156 disposed between its legs.

A pin 188 comparable to pin 156 is joined to the block 178 and a spring 190 on pin 188 normally holds the block 178 at the innermost end of its path of travel. A knob 192 on the pin 188 serves to return the dog for locking means 186 toward the locking position. As shown in Fig. 3, a radial pin 194 on the shaft 54 actuates the dog for locking means 186.

From the foregoing, it is apparent that an operator may, by the insertion of a coin 112, in the cabinet 24, obtain a drink that is either black coffee, coffee with sugar, coffee with cream, or coffee with cream and sugar, as he desires. In the event that he does not actuate the vending structures 42 and 44, the next purchaser may make an insertion of a coin and include sugar and/or cream, if he desires, since the operation of the coffee vending means can work independently of the sugar and cream dispenser.

If desired, the cabinet may be provided with cup dispensers, either of the automatic type or purely a vertical receptacle from which cups 200 depend as shown in Figs. 1 and 2.

It is now apparent that an efficiently operable hot coffee dispenser has been produced that is inexpensive to operate and easy to maintain. While the above description contemplates the use of hot coffee with sugar and cream, it is to be appreciated that any liquid might be used and any ingredients desired placed in the containers 36 and 38 to produce an altogether different type of hot or cold drink.

Accordingly, although but one embodiment has been disclosed, it is to be appreciated that such modifications as fairly come within the scope of the appended claims are contemplated hereby.

Having thus described the invention, what I claim as new and desire to secure by Letters Patent is:

1. In a dispenser of the kind described, an ingredient container; reciprocable structure for vending said ingredient from the container in measured quantities; shiftable means normally engaging said structure for holding the same against reciprocation; and manually operable means for releasing said holding means, said holding means having parts for yieldably holding the same in either the normal position or the released position.

2. In a dispenser of the kind described, an ingredient container; reciprocable structure for vending said ingredient from the container in measured quantities; shiftable means normally engaging said structure for holding the same against reciprocation; and manually operable means for releasing said holding means; and parts forming a portion of said structure, and engageable with said holding means upon movement of the structure in one direction for returning the holding means toward its normal position for engaging said structure.

3. In a dispenser of the kind described, an ingredient container; reciprocable structure for vending said ingredient from the container in measured quantities; shiftable means normally engaging said structure for holding the same against reciprocation; and manually operable means for releasing said holding means, said structure having a notched member thereon and reciprocable therewith, said holding means including a swingable, notch-engaging dog, having yieldable means for normally maintaining the same biased against the member.

RALPH E. PARKER.

REFERENCES CITED

The following references are of record in the file of this patent:

UNITED STATES PATENTS

| Number | Name | Date |
|---|---|---|
| 434,768 | Cochran | Aug. 19, 1890 |
| 484,573 | Schnoor | Oct. 18, 1892 |
| 943,649 | Buck | Dec. 21, 1909 |
| 1,520,560 | Burno | Dec. 23, 1924 |
| 1,568,574 | Speer | Jan. 5, 1926 |
| 1,753,278 | Westberg et al. | Apr. 8, 1930 |
| 1,767,256 | Pocock | June 24, 1930 |
| 2,462,019 | Bowman | Feb. 15, 1949 |